(12) United States Patent
Assaf et al.

(10) Patent No.: US 10,430,657 B2
(45) Date of Patent: Oct. 1, 2019

(54) OBJECT RECOGNITION TOOL

(71) Applicant: X Development LLC, Mountain View, CA (US)

(72) Inventors: Munaf Assaf, San Francisco, CA (US); May Wing-Sze Cheng, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 269 days.

(21) Appl. No.: 15/376,254

(22) Filed: Dec. 12, 2016

(65) Prior Publication Data
US 2018/0165518 A1 Jun. 14, 2018

(51) Int. Cl.
*G06K 9/00* (2006.01)
*B25J 19/02* (2006.01)
*G05D 1/02* (2006.01)
*B25J 9/16* (2006.01)
*G06F 3/0482* (2013.01)

(52) U.S. Cl.
CPC ........ *G06K 9/00671* (2013.01); *B25J 9/1656* (2013.01); *B25J 19/023* (2013.01); *G05D 1/0246* (2013.01); *G05B 2219/40577* (2013.01); *G06F 3/0482* (2013.01)

(58) Field of Classification Search
CPC ..... B25J 9/1656; B25J 19/023; G05D 1/0246; G05B 2219/40577; G06F 3/0482; G06K 9/00671
See application file for complete search history.

(56) References Cited

U.S. PATENT DOCUMENTS

| 7,720,775 | B2 | 5/2010 | Shimomura | |
|---|---|---|---|---|
| 8,984,136 | B1* | 3/2015 | Francis, Jr. | H04W 4/02 |
| | | | | 709/226 |
| 9,092,698 | B2 | 7/2015 | Buehler | |
| 2012/0053728 | A1 | 3/2012 | Theodorus | |
| 2014/0032033 | A1* | 1/2014 | Einecke | A01D 34/008 |
| | | | | 701/24 |
| 2015/0220086 | A1* | 8/2015 | Willgert | G05D 1/0214 |
| | | | | 701/26 |

(Continued)

OTHER PUBLICATIONS

Rouanet, et al., 'The Impact of Human-Robot Interfaces on the Learning of Visual Objects,' 2012 IEEE Transactions on Robotics, 17 pages.

(Continued)

*Primary Examiner* — Robert T Nguyen
(74) *Attorney, Agent, or Firm* — Fish & Richardson P.C.

(57) ABSTRACT

The subject matter of this specification generally relates to object recognition for robots. In some implementations, a method includes navigating a robot through an area to identify objects located in the area. The robot detects the presence of the objects in the area using one or more sensors. A determination is made that an object detected by the robot is not recognized by the robot. In response to determining that the object is not recognized by the robot, a user interface that includes data describing the object that is not recognized is provided. The user interface can be configured to receive user input that identifies the object. In response to interaction with the user interface, data identifying the object is received. A database for the robot is updated with the data identifying the object.

20 Claims, 5 Drawing Sheets

(56) References Cited

U.S. PATENT DOCUMENTS

2016/0065884 A1* 3/2016 Di Censo ............... H04N 5/765
  386/227
2017/0206691 A1* 7/2017 Harrises .................. G06T 11/60
2017/0212518 A1* 7/2017 Iimura .................. G05D 1/0214

OTHER PUBLICATIONS

International Search Report and Written Opinion issued in International Application No. PCT/US2017/065669, dated May 11, 2018, 22 pages.
Murakami et al. "Interactive Robot Supporting System for Object Acquisition," SICE Annual Conference, Jan. 1, 2007, 6 pages.

* cited by examiner

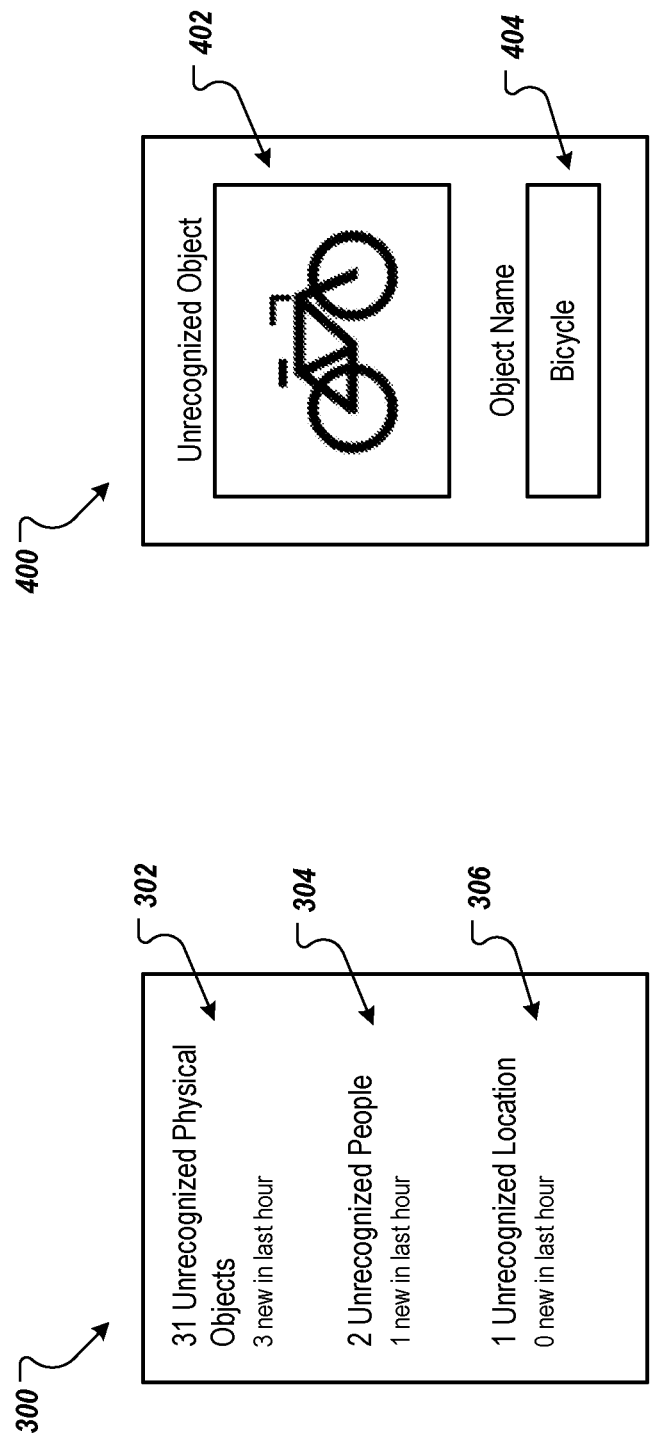

OBJECT RECOGNITION TOOL

TECHNICAL FIELD

This disclosure generally relates to object recognition for robots.

BACKGROUND

A robot can be programmed to perform actions with respect to various types of objects. For example, a robot can be programmed to open a door or pick up and move an object. To perform such tasks, an autonomous or semi-autonomous robot should detect the object and determine how to perform the task on or using the object.

SUMMARY

This specification describes systems, methods, devices, and other techniques for improving object recognition for robots. In general, a robot can explore an area and detect the presence of objects in the area, e.g., based on image or video frames received from a camera of the robot. The robot can then determine whether the object is an object that the robot recognizes. If the robot does not recognize the object, the robot can attempt to obtain data identifying the object from other data sources. For example, the robot may initiate an image search at a search engine using one or more images of the object captured by the robot. A mobile tool can also allow users to provide data identifying objects to the robot. For example, the robot can provide images and/or other data about unrecognized objects to the mobile tool. The mobile tool can provide a user interface in which a user can identify the objects based on the data provided by the robot. For example, the user interface may present an image of the object, and the user may provide text that identifies the object in the image.

Some implementations of the subject matter described herein include navigating a robot through an area to identify objects located in the area. The robot detects the presence of the objects in the area using one or more sensors. A determination is made that an object detected by the robot is not recognized by the robot. In response to determining that the object is not recognized by the robot, a user interface is provided that includes data describing the object that is not recognized, the user interface being configured to receive user input that identifies the object. Data identifying the object is received in response to interaction with the user interface. A database for the robot is update with the data identifying the object.

These and other implementations can optionally include one or more of the following features. One or more actions that the robot can perform with respect to the object can be identified in response to receiving the data identifying the object and associating software for performing the one or more actions with the data identifying the object in the database. One or more applications for the object can be obtained. Each application can instruct the robot to perform one or more actions with respect to the object. The robot can be enabled to use the one or more applications when the robot detects the object.

The robot can automatically obtain information about the object in response to determining that the object is not recognized by the robot. Automatically obtaining information about the object can include capturing, by the robot and using a camera of the robot, one or more images of the object. A search can be initiated using the one or more images. Search results identified in response to the search can be received. An identity of the object can be determined based on one or more objects referenced by resources linked to by the search results.

A log of objects that are not recognized by the robot can be generated. A user interface that prompts a user to identify each object in the log can be provided. An image of a particular object and data identifying the particular object can be received at the user interface. The database can be updated with the image and the data identifying the particular object.

A product catalog that includes images of one or more objects and data describing the one or more objects can be received. The image of the object and data identifying the object can be stored in the database for each of the one or more objects.

Aspects can include causing a robot to navigate about a particular area that includes multiple objects. A log of objects located in the particular area and that the robot does not recognize can be generated. A user interface that allows the user to identify each object in the log can be provided.

The object can include a physical object, a location, an animal, or a person. The user interface can present multiple images of objects that the robot did not recognize. The user interface can present a first set of images of objects that the robot recognized and a second set of images of objects that the robot did not recognize.

The user interface can be generated by a mobile tool of a user device using one or more images of the object captured by the robot. The user interface can be presented by the user device. The user device can send the data identifying the object to the robot. The mobile tool can obtain the one or more images of the object from a server that received the one or more images from the robot.

Various features and advantages of the foregoing subject matter is described below with respect to the figures. Additional features and advantages are apparent from the subject matter described herein and the claims.

DESCRIPTION OF DRAWINGS

FIG. 3 depicts an example user interface for identifying objects that a robot does not recognize.

FIG. 4 depicts an example user interface for identifying objects that a robot does not recognize.

DETAILED DESCRIPTION

Figure 1:
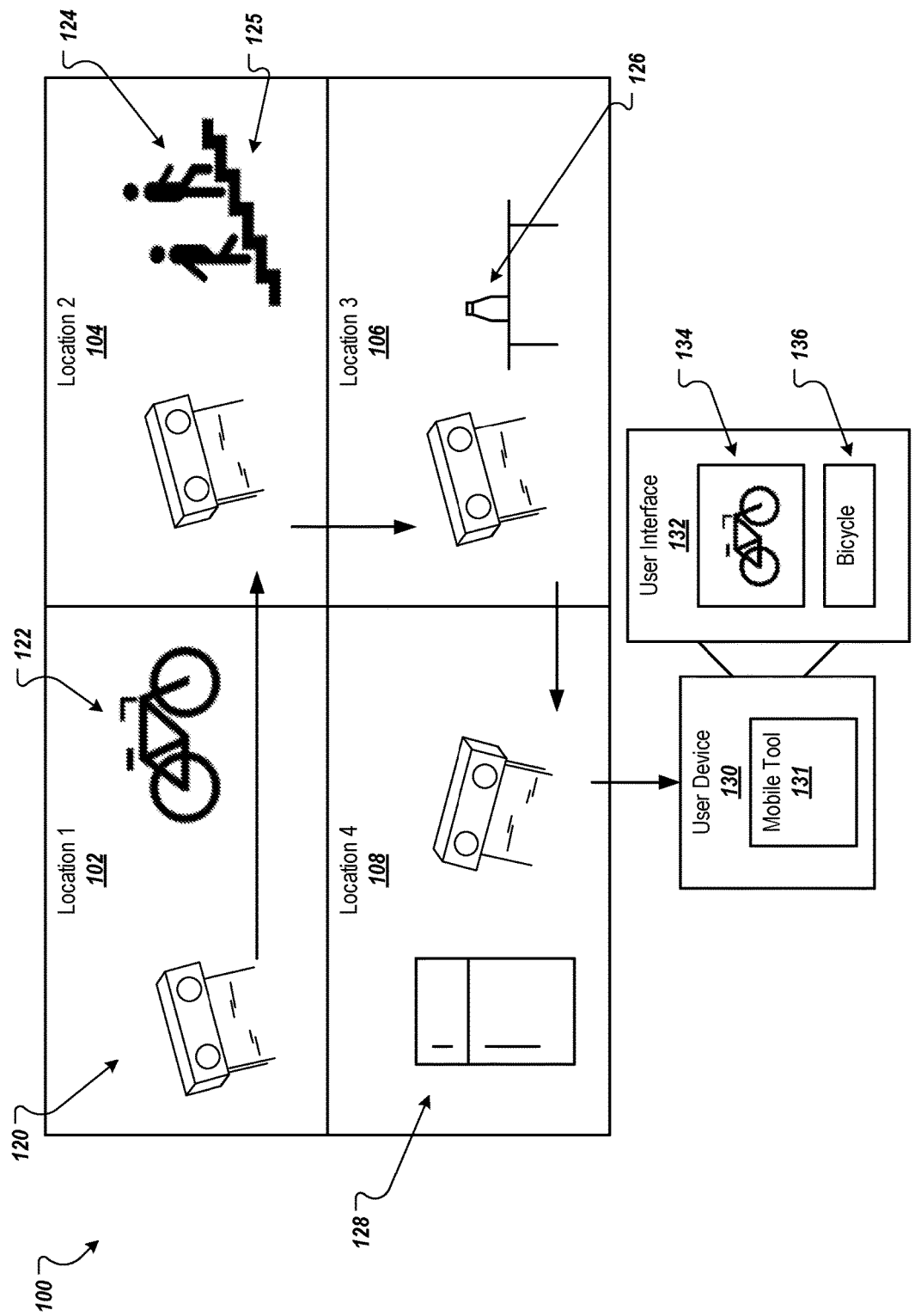
FIG. 1 depicts a robot navigating an area and identifying objects and locations within the area.

In general, this disclosure describes systems, methods, devices, and other techniques for improving object recognition for robots. A robot can perform tasks with respect to objects that the robot recognizes. For example, a robot may be programmed to pick up a particular object in a particular way. To pick up an object in the proper way, the robot can detect the presence of the object, identify the detected object, and determine the proper way to pick up the object. Improved object recognition for robots allows the robots to recognize more objects and thus perform more tasks for a user. In addition, improved object recognition reduces the occurrences of incorrect object identification and incorrect actions performed with respect to the incorrectly identified objects. For example, improved object recognition may reduce the occurrences of actions that break, damage, or misuse an object resulting from object misidentification.

The object recognition of a robot can be improved using a mobile tool, e.g., a mobile application or other software for a mobile device, that allows a user to identify objects that the robot does not recognize. The user can run the mobile tool on a smartphone, tablet computer, or other mobile device. Identifying the object enables the robot to recognize the object at a later time. Identifying the object can include assigning a label to one or more images of the object indicating what the one or more images represents.

The robot can navigate itself about an area, e.g., a house, office, or warehouse, to explore the area and to recognize objects and/or individual locations (e.g., rooms) of the area. The objects can include physical objects, people, animals, plants, and/or other appropriate types of objects. If the robot cannot identify a particular object or location, the robot can store data for the unidentified item, e.g., a location and image, locally or at a remote server system. Then, the robot or another system can provide data about the object (e.g., images of the object) to the mobile tool and the mobile tool can present a user interface that prompts a user to identify the object or location. For example, the user can enter into the user interface the name of the object or a type of object. In turn, the robot can assign the user-entered name or type to the images or other data about the object. The mobile tool can also generate a log of unknown objects and locations for a user to identify.

The robot can also attempt to identify an object and/or obtain more information about an object, e.g., automatically in response to detecting an object that the robot does not recognize. For example, the robot may capture images of the object from multiple angles, identify the dimensions of the object, and/or identify words or codes printed on the object. In this example, identifying the object can include the robot using computer vision and/or object recognition techniques to determine that the object is a particular object or a particular type of object and assign a label to the images or dimensions of the object that specifies the particular object or particular type of object.

The robot can also learn the identity of objects from external sources, such as product catalogs, scanning a QR code, initiating web searches, etc. For example, the robot may capture an image of an unrecognized object and initiate an image search at a search engine (e.g., an Internet search engine) using the image as a query. The robot can then analyze search results provided in response to the search to identify the object. For example, if one or more resources linked to by highly-ranked search results refer to the same object, the robot may determine that the unrecognized object is the object referenced by the resources. In another example, the robot may assign, as the identity of the unrecognized object, a keyword, label, or caption of an image that is similar to (e.g., has at least a threshold similarity with) the image of the unrecognized object.

By learning the identities of objects, functionality of the robot can be enhanced or unlocked. For example, from user input to a user interface or other data, a robot may learn that a detected object is an object of a particular type. In response, the robot may identify a robot application that can instruct the robot to perform a task with respect to objects of the particular type. In this manner, the robot can identify or acquire software that gives the robot capabilities for interacting with identified objects. A robot application can include instructions that, when executed by a data processing apparatus of a robot, cause the robot to perform an action that interacts with an object. For example, the robot may download an application that includes instructions enabling the robot to operate a toaster in response to identifying a toaster in a house.

FIG. 1 depicts a robot 120 navigating an area 100 and identifying objects and locations within the area. The robot 120 may be an autonomous robot or a semi-autonomous robot. An autonomous robot is a robot that performs actions on its own without human control. A semi-autonomous robot is a robot that shares control with a human. For example, a semi-autonomous robot may be manually controlled to perform some actions, while being able to perform other actions without human input.

The robot can include a data processing apparatus that causes the robot to navigate about the area 100 to identify objects and individual locations within the area 100. For example, a robot that is being introduced to a new home, office, warehouse, industrial facility, or other type of area may explore the area to identify objects and locations within the area. In some implementations, a user can use a mobile tool 131 of a user device 130 to instruct the robot 120 to explore the area 100 to identify objects and locations within the area 100. For example, the robot 120 includes an explore mode of operation that can be activated using the mobile tool 131 of the user device 130. The robot 120 can navigate itself about the area 100 in response to receiving data from the user device 130 indicating that the explore mode has been activated. In this mode, the robot 120 may roam the area in a self-directed manner.

In some implementations, the robot 120 can explore an area 100 automatically, e.g., without human command to explore the area. For example, the robot 120 may initiate the explore mode on its own in response to detecting certain events, unrecognized objects, or other stimuli. For example, the robot 120 may explore the area 100 in response to determining that the robot 120 has not previously been in the area 100 or in response to determining that the robot 120 has not been in the area 120 for at least a threshold amount of time. In another example, the robot 120 may explore the area 100 in response to detecting the presence in the area 100 of at least a threshold number of objects that the robot 120 does not recognize. In yet another example, the robot 120 may explore the area 100 in response to determining that the area 100 includes a new object or that previously identified objects are in new locations within the area. The robot 120 can explore the area 100 after its initial exploration of the area 100 in response to detecting these situations.

The data processing apparatus of the robot 120 can cause the robot 120 to navigate the area 100 autonomously without human instruction. The robot 120 can include one or more sensors, such as a camera and/or a Global Positioning System (GPS) receiver. The robot 120 can navigate to objects and/or locations of the area 100 based on data received from the sensor(s). For example, the robot 120 can detect objects in images captured by the camera and navigate to the detected objects. In another example, the robot 120 can use images and/or GPS location data to identify parts of the area 100 where the robot 120 has not been and navigate to those parts of the area 100.

In some implementations, a human user may at least partially guide the robot 120 while the robot 120 captures data about its surroundings. For example, a user may guide the robot to a certain room of a house, or may guide the robot along a particular path. The robot 120 may capture images along a user-specified route. As another example, a user may guide the robot 120 to a specific area, and the robot 120 may explore the specific area indicated by the user.

In the example illustrated in FIG. 1, the robot 120 has navigated to a first location 102 of the area 100. For example, the first location 102 may be a room in a house. The first location 102 includes a bicycle 122. While navigating about the first location 102, the robot 120 may use a camera to capture images or video of the first location 102. The robot 120 can analyze each image or video frame to detect the presence of objects in the first location 102. For example, the robot 120 may use image processing techniques on the images or video frames to detect the presence of objects in the images and the location of the objects with respect to the location of the robot 120. This may include detecting edges or contrasts in color, brightness, pattern, etc. to determine which portions of an image correspond to different objects. When available, a robot may use depth information, e.g., three-dimensional data generated using a stereo camera, radar, lidar, or other sensor, to detect the presence and shape of objects and to distinguish objects from a background and each other.

In response to detecting that an object, e.g., a bicycle 122, is present in one of the images or video frames, the robot may approach the bicycle 122. The robot 120 can then determine whether the bicycle is a recognized object. For example, the robot 120 may capture images of the bicycle from multiple angles and then use object recognition techniques to identify the object. For example, the robot 120 may compare the images to images of recognized objects, use local object recognition model, or provide image data over a network for server-based object recognition. The robot 120 can also obtain additional data about the bicycle 122, such as dimensions of the bicycle 122, any text printed on the bicycle 122 (e.g., on a label), and/or visual codes (e.g., bar codes) printed on the bicycle 120. The robot 120 can use the data to attempt to identify the bicycle 122. For example, the robot 120 can compare the dimensions to dimensions of recognized objects. In another example, the robot 120 can scan a bar code or Quick Response (QR) code to identify the object associated with the code. For example, a bar code may provide a product identifier that the robot can use to identify the object. As another example, a QR code may indicate a URL or other data that the robot 120 can use to download information about the object from the Internet.

If the robot 120 determines that the bicycle 122 is a recognized object, the robot may store data identifying the object as a bicycle and data identifying the location of the bicycle 122 in memory. For example, the robot 120 may store a label for the object, such as a text label and/or classification, as well as data identifying the room and/or GPS coordinates of the bicycle 122 in memory. In this way, the robot 122 can track locations where the bicycle 122 has been. For example, this tracking of locations can allow the robot 122 to more quickly identify the location of the bicycle 122 in response to a user command to perform some action, e.g., retrieve the bicycle 122.

If the robot 120 determines that the detected object, e.g., bicycle 122 in this case, is not recognized, the robot 120 can send data about the bicycle 122, e.g., image(s), dimensions, text printed on the bicycle 122 and/or visual codes printed on the bicycle, to the user device 130 of a user. In some implementations, the robot 120 stores the data about the bicycle 122 in memory of the robot and/or sends the data about the bicycle 122 to a server, e.g., a server in the cloud. The data about the bicycle can then be provided to the user, e.g., when the user opens the mobile tool 131. For example, when the mobile tool 131 is opened, the mobile tool 131 may request data about unrecognized objects from the cloud server or the robot 120.

The mobile tool 131 of the user device 130 can generate and present a user interface 132 that allows a user to identify unrecognized objects, such as the bicycle 122. For example, the user interface 132 may present an image 134 of the bicycle 122 received from the robot 122 and/or other data about the bicycle 122. This information may be received from the robot 120 or from a server system or another device. Additional information about unrecognized objects could include, for example, a location of an unrecognized object (e.g., which room of a house), a time that the image was captured, a size of the object determined by the robot, and so on.

In the example of FIG. 1, the user interface 132 also includes a text entry field 136 in which a user can enter, e.g., type, input that describes the object. For example, the user can enter the text "bicycle" to indicate what type of object the bicycle 122 is. The user interface 132 can additionally or alternatively include other user interface elements, such as drop down lists for selecting a name for unrecognized objects, a text entry field or drop down list for entering/selecting a category for unrecognized objects, a text entry field or drop down list for entering/selecting locations where the unrecognized objects should be located, and/or a text entry field for entering the make, model, brand, or type of object, or other appropriate data about unrecognized objects. In some implementations, drop down lists or other visual elements are populated with object names from a predetermined set or hierarchy of categories or classifications.

The robot 120 can store data received from the user interface 132 in memory of the robot 120. For example, the robot 120 may store data about recognized objects in the memory of the robot 120. The data for the bicycle 122 stored in memory can include the images of the bicycle 122 that the robot 120 captured using its camera, the name of the bicycle 122 entered into the text entry field 136, dimensions of the bicycle 122, and the location of the bicycle 122 (e.g., room and/or GPS coordinates). The robot 120 can use this information to recognize the bicycle 122 when the robot 120 detects the bicycle 122 at a later time. For example, the robot 120 can compare images and dimensions of objects to the images and dimensions of the bicycle 122 to determine whether the object is the bicycle 122. In addition, or as an alternative, the data received through the user interface 132 can be used to update a database for the robot 120 stored remotely by a server system. Similarly, the user input and the association of the user input with the image of the unrecognized object may be used to update an image recognition system or a shared database used by robots of multiple users.

In some implementations, functionality of the robot 120 that is associated with the bicycle 122 may be unlocked in response to identifying the bicycle 122 and the robot 120 being able to recognize the bicycle 122. For example, there may be a set of actions that a robot can perform with respect to particular objects or particular objects of a particular type, category, make, or model. This functionality for an object may not be available to the robot 120 until the robot 120 has recognized the object. In response to identifying a previously unrecognized object, the robot 120 may identify the actions that the robot 120 can perform with respect to the object.

In some implementations, the robot 120 includes robot applications that include instructions enabling the robot 120 to perform actions with respect to objects. The robot 120 can include one or more robot applications for each object or type of object with which the robot 120 can perform an action. For example, the robot 120 may include a separate robot application for each individual action. In another example, the robot 120 may include an application for each object that includes the instructions for each action that the robot 120 can perform with respect to the object. As another example, a robot application for an object may indicate points on the object where the robot should grasp the object, weight information and strength information that the robot can use to determine how much force to apply when gripping, and so on.

Upon identifying a previously unrecognized object, the robot 120 can identify the robot application(s) for the object. For example, upon receiving data identifying the bicycle 122 from the user interface 132 by way of the mobile tool 131, the robot 120 may identify the robot application(s) that would be appropriate for the bicycle 122. The robot application(s) for the bicycle 122 may already be stored on the robot 122, e.g., preloaded on the robot 120 before being deployed to the area 100. In some implementations, the robot 120 may automatically obtain the robot application(s) for the bicycle, e.g., download the robot application(s) for the bicycle 122 from an application provider over the Internet, in response to identifying the bicycle 122. For example, the robot 120 may provide data identifying the bicycle 122 (e.g., the text name and/or image of the bicycle 122) to the application provider along with a request for robot application(s) for the bicycle 122. In response, the application provider may provide the robot application(s) for the bicycle 122 to the robot 120. The robot 120 can then use the robot application(s) for the bicycle 122 to perform actions with respect to the bicycle 122, e.g., in response to a user command. In some implementations, the robot 120 may associate the robot application(s) with the bicycle in memory of the robot 120 so that the robot 120 can identify the appropriate robot application(s) for the bicycle 122 when the robot 120 detects the bicycle 122 again.

The robot 120 can also identify the first location 102, e.g., in response to exploring the first location 102 for the first time. In the example, the first location 102 represents a room of a building, but the first location 102 could alternatively represent a portion of a room, a building as a whole, a GPS coordinate, or other location. To identify the first location 102, the robot 120 may provide data about the first location 102 to the user device 130. This data can include images of the first location 102, data identifying recognized objects in the first location 102 (e.g., the bicycle 122), data identifying other locations near or adjacent to the first location 102, and/or other appropriate data about the first location 102. The mobile tool 131 can present the user interface 132, or a similar user interface, to obtain data from a user identifying the first location 102. For example, the user interface may present an image of the first location and/or other data about the first location received from the robot 120. A user can enter the name of the first location 102 in the text entry field 136 or select the name of the first location from a drop down list. The mobile tool 131 can provide the name of the first location 102 to the robot 120. In turn, the robot 120 can store the name of the first location 102 in the robot's memory. The robot 120 can also store, for the first location 102, data identifying the location of the first location 102 (e.g., GPS coordinates), images of the first location 102, data identifying recognized objects located in the first location 102, and/or other appropriate data about the first location 102.

After navigating about the first location 102 and identifying objects located in the first location 102, the robot 120 can navigate to a second location 104 of the area 102. For example, the robot 120 may determine to navigate to the second location 104 in response to determining that the robot 120 has identified or at least attempted to identify each object in the first location 102 of which the robot 120 detected the presence. In some implementations, the robot 120 self-navigates to explore multiple locations 102, 104, 106, 108 in an area, such as a house. As it travels, the robot 120 determines what objects can be automatically identified and which cannot. The robot 120 can continue to explore and move from area to area, adding to the list of unidentified objects as it explores, without waiting for human feedback using the mobile tool. At any time, perhaps during exploration or after the robot's exploration is complete, the user can use the mobile tool to provide the identity of items that the robot could not identify.

In the second location 104, the robot 120 can detect the presence of people 124 and stairs 125 and determine whether the people 124 and stairs are recognized by the robot 120. The robot 120 can determine a list of unrecognized people 124, animals, and plants similar to how the robot 120 identifies other unrecognized objects. For example, the robot 120 may capture images of each person (e.g., images of each person's face) and compare the images to images of recognized people. The robot 120 can also obtain and use other data, such as dimensions (e.g., height) of the people 124, to determine if the people 124 are people that the robot 120 recognizes. If the robot 120 does not recognize the people, e.g., the images of the people 124 do not match an image of a recognized person, the robot 120 may send the images of the people 124 and/or other data obtained by the robot 120 to the mobile device 130. The mobile tool 131 of the mobile device 130 can present the user interface 132 to obtain data identifying the people 124, e.g., the names of the people, from a user of the user device 130. For example, the user interface 132 may present one or more images of each person received from the robot 120 and receive the names of each person in the text entry field 136. The user interface 132 can also include text entry fields, drop down lists, or other user interface elements to obtain other data about each person, such as, gender, height, objects that the person is permitted to command the robot 120 to manipulate, or other appropriate data about each person. The mobile tool 131 can send the data identifying the people 124 back to the robot 120. In turn, the robot 120 can store the data identifying each person in memory with images of the person and other appropriate data about the person, e.g., gender, height, objects that the person is permitted to command the robot 120 to manipulate, etc.

After navigating about the second location 104 and identifying objects and people located in the second location 104, the robot 120 can navigate to a third location 106 of the area 102. At the third location, the robot 120 can detect the presence of a bottle 126 sitting on a table and identify the bottle 126 in a similar manner as the robot identified the bicycle 122. The robot 120 can also unlock functionality for the bottle 126, e.g., by identifying or downloading a robot application for manipulating bottles. For example, the robot 120 may identify a robot application that instructs the robot 120 how to properly pick up the bottle. The robot application may instruct the robot 120 on where to grasp the bottle 126, how much force to apply to grasping the bottle 126, etc.

For objects like bottles that may vary in materials, weight, and other characteristics, it may be important for the robot 120 to identify or obtain an appropriate robot application for bottles having those characteristics. For example, a glass bottle may require a different grip than a plastic bottle. To properly identify the bottle 126, the robot 120 may compare the shape, dimensions, colors, type of lid, and other appropriate characteristics of the bottle 126 to the corresponding characteristics of various bottles. The robot 120 may also use computer vision techniques to detect the material of the bottle 126.

After navigating about the third location 106 and identifying objects located in the third location 106, the robot 120 can navigate to a fourth location 108 of the area 102. At the fourth location 108, the robot can detect the presence of a refrigerator 128 and identify the refrigerator 128 in a similar manner as the bicycle 122 and the bottle 126. The robot 120 can also unlock functionality for the refrigerator 128, e.g., by identifying or downloading a robot application for the refrigerator 128. For example, the robot 120 may identify a robot application that instructs the robot 120 how to properly open one or more doors of the refrigerator 128, how to operate an ice/water dispenser of the refrigerator 128, and/or how to perform other appropriate actions that can be performed with respect to the refrigerator 128.

The robot 120 can identify and store data about each of the locations 102-108 of the area 100 that the robot 120 explores. For example, the robot 120 can store a name of the location (e.g., kitchen, living room etc.), location data for the location (e.g., GPS coordinates), recognized objects located in the location, images or data about unrecognized objects in the location, people or animals found in the location, or other appropriate data about each location. The name of the location can be received from a user at the user interface 132 or determined by the robot 120. The robot 120 may determine the name of a location based on the objects located in the location. For example, the robot 120 may determine that the fourth location 108 is a kitchen based on the robot 120 identifying the refrigerator 128 in the fourth location 108.

Figure 2:
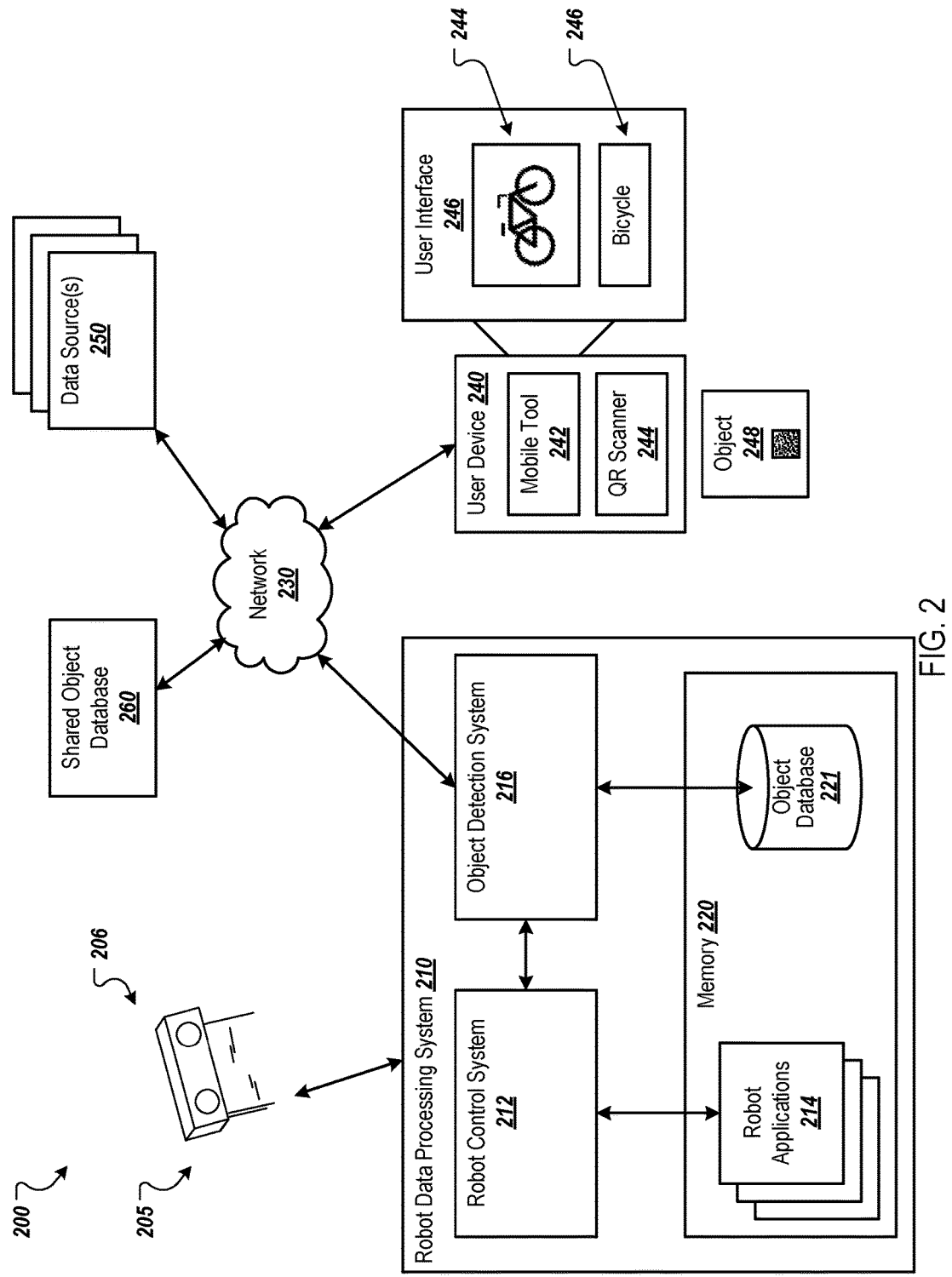
FIG. 2 depicts an example environment in which a robot identifies objects.

FIG. 2 depicts an example environment 200 in which a robot 205 identifies objects. The robot 205 includes a camera 206 and a robot data processing system 210, which can include one or more data processing apparatus, e.g., one or more processors. The robot data processing system 210 includes a robot control system 212 that controls the movement of the robot 205. For example, the robot control system 212 may operate wheels or legs of the robot 205 to navigate the robot 205 from one place to another. The robot control system 212 may also control arms, the camera 206, the head of the robot 205 where the camera 206 is mounted, and/or other parts of the robot 205.

In some implementations, the robot control system 212 controls the robot 205 using robot applications 214. Each robot application 214 can include computer-readable instructions that, when executed by a data processing apparatus of the robot control system 212, causes the robot control system 212 to control the robot 205 in a particular way. For example, a robot application for picking up a banana may instruct the robot control system 212 to cause the robot's arm to reach for a banana, grasp the banana with a correct amount of force, and pick the banana up.

The robot 205 can store the robot applications 214 in memory 220 of the robot 205. The memory 220 can include one or more hard drives, flash memory, or other types of data storage devices. When the robot 205 receives a command to perform an action (e.g., from a user) or determines on its own to perform an action, the robot control system 212 can identify the appropriate robot application 214 and use the robot application 214 to perform the action.

The robot data processing system 210 also includes an object detection system 216. The object detection system 216 can identify objects detected by the robot 205. For example, the camera 206 can capture still images and/or video of the area at which the robot 205 is facing. The object detection system 216 can identify objects in images and/or frames of video captured by the robot's camera 206.

The object detection system 216 can maintain an object database 221 that includes a list of objects that the robot 205 recognizes and data about each recognized object. For example, the data about a recognized object stored in the object database 221 can include one or more images of the object, dimensions of the object, locations in which the object has been found, the color(s) of the object, text found on the object, and/or visual codes found on the object. For a person, the object database 221 can include data specifying objects that the person has the authority to command the robot 205 to operate. For example, a parent user may not allow a child user to command the robot 205 to operate a stove. The object database 221 may also include similar data about unrecognized objects, but without an identifier or name for the unrecognized objects. For each object, the object database 221 can include data, e.g., a data flag, indicating whether the object is recognized or unrecognized.

The object detection system 216 can detect and identify objects depicted in images and/or video frames received from the camera 206. For example, the object detection system 216 may analyze the images and/or video frames using edge and contrast detection techniques to detect the presence of objects in the images. The object detection system 216 can then compare an object detected in the images and/or video frames to the data about recognized objects stored in the object database 221 to determine whether the detected object is an object that the robot 205 recognizes. For example, the object detection system 216 may compare one or more images of the detected object received from the camera 206, dimensions of the detected object obtained by the robot 205, and/or text or visual codes printed on the object captured by the camera 206 to corresponding data of recognized objects stored in the object database 221.

The object detection system 216 can attempt to identify objects that the robot 205 encounters while performing actions and/or while exploring an area. For example, the robot 205 may be instructed to obtain a soda from a refrigerator. The robot control system 212 may navigate the robot 205 to the refrigerator based on known location data for the refrigerator. Along the way, the robot 205 may capture video of the area along the path to the refrigerator. The object detection system 216 can receive frames of the video and attempt to identify objects in the video frames as the robot 205 is navigating to the refrigerator. In this way, if the object detection system 216 identifies an obstacle in its path, the robot control system 212 can identify the appropriate robot application 214 to move the obstacle. If the obstacle is an unrecognized object, the robot control system 212 may instead find another route to the refrigerator or ask a human user for help. The object detection system 216 can also detect the refrigerator when the robot 205 reaches the location of the refrigerator and then detect the proper soda in the refrigerator after the robot 205 opens the refrigerator door.

The object detection system 216 can attempt to identify unrecognized objects while the robot 205 is exploring an area, e.g., while in an explore mode of operation. For example, the object detection system 216 can receive images and video frames from the camera 206 as the robot explores an area. For each detected object, the object detection system 216 can determine whether the detected object is a recognized object listed in the object database 221. If the detected object is listed in the object database 221, the object detection system 216 may update the data for the object with new images and/or with location data if the object has been found in a new location where the object has not previously been found.

If a detected object does not match one of the recognized objects, e.g., during exploration of an area or while performing a task, the object detection system 216 can attempt to identify the detected object in one or more ways. Identifying an unrecognized object can include receiving data identifying the object or the type of object and/or determining the identity or type of the object based on data about the object, e.g., images of the object, dimensions of the object, etc. Once the identity or type of object has been received or determined, the robot 205 can recognize the object in the future, e.g., using the data about the object.

In some implementations, the robot 205 can prompt a user to provide data identifying one or more unrecognized objects. For example, the object detection system 216 may provide data about the unrecognized object(s) to a mobile tool 242 of a user device 240 of a user over a network 230, e.g., a local area network (LAN), a wide area network (WAN), the Internet, a mobile network, or a combination thereof. The data for an unrecognized object can include one or more images of the object, dimensions of the object, text or visual codes printed on the object, the location where the object was found, and/or other appropriate data about the object. In another example, the object detection system 216 may provide the data about the unrecognized object(s) to a server over the network 230. In turn, the server can provide the data to the mobile tool 242, e.g., in response to the mobile tool 242 requesting the data.

The user device 240 may be a smart phone, a tablet computer, a laptop computer, a desktop computer, or another appropriate type of user device. The mobile tool 242 may be a software application, e.g., a mobile app, that enables the user to identify unrecognized objects for the robot 205. The mobile tool 242 can present one or more user interfaces, such as the user interface 246, that enable the user to identify unrecognized objects. For example, the user interface 246 may present data about the unrecognized object received from the object detection system 216 and prompt the user to provide or select a name, identifier, or type for the unrecognized object. In the illustrated example, the user interface 246 presents an image 244 of an unrecognized bicycle and a text entry field 246 for receiving a name of the object. The user interface 246 can also include drop down lists for selecting the name of the object and/or user interface elements for receiving additional data about the object, e.g., a text entry field or drop down list for entering/selecting the category of unrecognized objects, a text entry field or drop down list for entering/selecting the locations where the unrecognized objects should be located, and/or a text entry field for entering the make, model, brand, or type of object, or other appropriate data about unrecognized objects. The user interface may additionally or alternatively permit a user to enter information about an object in another manner, for example, scanning an optical code such as a bar code or QR code for the object, entering a URL for a web page associated with the object, indicating a transaction or product catalog related to the object, and so on.

The mobile tool 242 can provide data received at the user interface 246 for the unrecognized object to the object detection system 216. The object detection system 216 can store the received data along with the data obtained by the robot 205 in the object database 221. The object detection system 216 can also indicate, in the object database 221, that the object is now a recognized object. If the user does not identify the unrecognized object at the user interface 246, the object detection system 216 may indicate, in the object database 221, that the object is unrecognized. The object detection system 216 may later prompt the user for data identifying the unrecognized object using the mobile tool 242 based on the unrecognized status in the object database 221.

In some implementations, the object detection system 216 generates a log of unrecognized objects that the robot 205 has detected, e.g., since a last time at which a user identified unrecognized objects using the mobile tool 242. The mobile tool 242 can present a user interface, such as the user interface 300 of FIG. 3 that enables a user to identify the unrecognized objects in the log. The robot 205 may store the log in its memory 220 or at a remote server, e.g., in the cloud.

The object detection system 216 can also attempt to identify objects without human input. For example, identifying an unrecognized object by the object detection system 216 may include the use of one or more data sources 250. In some implementations, identifying the unrecognized object by the object detection system 216 may include initiating an image search at a search engine using one or more images of an unrecognized object. The object detection system 216 can receive resources (e.g., web pages) linked to by search results provided in response to the image search and analyze the resources to determine the identity of the object. For example, if multiple resources are directed to the same product, the object detection system 216 may determine that the unrecognized object is that product. However, if the resources are directed to various different products, the object detection system 216 may determine that the object is still unrecognized.

In another example, one or more of the resources may include images of products. The object detection system 216 can analyze the images and/or text around the images to identify the unrecognized object. If one of the images is a close match, e.g., based on similarity of visual characteristic between the one image and an image of the unrecognized object, the object detection system 216 may identify the image based on a caption for the image or text near the image. For example, the object detection system 216 may detect an object name that is in the caption or near the image and identify the unrecognized object as the object name.

The object detection system 216 can also identify unrecognized objects based on text printed on the object or on labels attached to the unrecognized objects. For example, the robot's camera 206 may capture an image of text printed on the unrecognized object and attempt to identify an object name included in the text. The object detection system 216 may also compare the images of the unrecognized object and/or the dimensions of the unrecognized object to images and/or dimensions of objects having he identified object name. If the images or dimensions are sufficiently similar, the object detection system 216 may identify the unrecognized object as the object name.

The object detection system 216 can also identify unrecognized objects based on visual codes printed on the objects or on labels attached to the unrecognized objects. The visual code may include a bar code or QR code. Such codes are linked to specific objects. The object recognition system 216 can send an image of the visual code to a data source 250 that can identify the object linked to the visual code.

In some implementations, a user of the robot 205 or the user device 240 can provide data to the object detection system 216 that allows the object detection system 216 to learn to recognize objects. For example, a user may use a camera of the user device 240 to capture an image of an object that the user wants to identify for the robot. The user can use the mobile tool 242 to find the image on the mobile device 240 and provide an identifier, name, or type for the object. The mobile tool 242 can provide the image and the identifier, name, or type for the object to the object detection system 216. In turn, the object detection system 216 can update the object database 221 to include the object as a recognized object, along with its image and any other data provided by the user. This gives the user the option of teaching an autonomous or semi-autonomous robot about its surroundings without directly manipulating the robot.

A user can identify a location in a similar manner. For example, the user may take the user device 240 into the location and use the mobile tool 242 to identify the current location of the user device 240 as a particular location. The mobile tool 242 can interact with a GPS receiver of the user device 240 to obtain GPS coordinates for the current location of the user device 240. The mobile tool 242 can then provide the name of the location received from the user and the GPS coordinates to the object detection system 216. In turn, the object detection system 216 can update the object database 221 to include the name of the location and the GPS coordinates of the location as a known location.

A user can also identify an object for the robot 205 using a QR scanner 244 of the user device 240. For example, the user may scan a QR code for an object 248 using the QR scanner 244. The QR scanner 244 can provide data about the scanned object to the mobile tool 242. This data can include the name of the object, a description of the object, and/or images of the object. The user can also capture an image of the actual object 248 using a camera of the user device 240. The mobile tool 242 can provide the data received from the QR scanner 244 and any user captured images of the object 248 to the object detection system 216. In turn, the object detection system 216 can update the object database 221 to include the object 248 as a recognized object, along with its image and any other data provided by the QR scanner 244.

In some implementations, the object detection system 216 can learn to recognize objects based on one or more documents, e.g., one or more documents provided by a user. For example, a user may provide the object detection system 216 with a product catalog using the mobile tool 242. In a particular example, the user may use a user interface of the mobile tool 242 to identify a product catalog stored on the user device 240 or at another data source 250, such as a business's web page. The object detection system 216 can process the product catalog to identify products in the catalog and data for each product. For example, the object detection system 216 may identify object names for products in the catalog and for each object name, one or more images of the product, a description of the product, optional features or colors of the product, dimensions of the product, and/or other appropriate data included in the product catalog. For each product, the object detection system 216 may update the object database 221 to include the product as a recognized object, along with its image and any other data identified in the product catalog for the product.

The object database 221 can also associate recognized objects with robot applications for the recognized objects. For example, the robot 205 may identify robot applications for previously unrecognized objects automatically in response to identifying the previously unrecognized objects. The robot 205 may obtain the robot applications for an object, e.g., by downloading the robot applications from an application provider, and store the robot application in memory 220. In addition, the robot 205 may update the object database 221 to specify which robot application corresponds to each recognized object. By obtaining the robot application for an object associating the application with the object in the object database 221, the robot 205 can identify the appropriate robot application for the object when the robot 205 later detects the object.

Data about objects can be shared between multiple robots, e.g., to allow a group of robots to learn to recognized objects. For example, data about identified objects can be stored in a shared object database 260 that is shared among multiple robots, e.g., a fleet of robots. When a previously unrecognized object is identified for or by a robot, the robot can update its object database with data about the object and the identity of the object. The robot can also update the shared object database 260 with the data about the object. In this way, each robot can use the data about the object stored in the shared object database 260 to recognize the object. This allows a group of robots to learn to recognize objects based on the objects that each robot in the group has identified.

For example, a first robot may detect the presence of a previously unrecognized hoverboard and provide images, dimensions, and/or other data about the hoverboard to the mobile tool 242. A user may provide data identifying the hoverboard, e.g., the label "hoverboard" to the mobile tool 242 and the mobile tool 242 may provide the data identifying the hover board to the robot. The robot may associate the images, dimensions, and/or other data about hoverboard with the data identifying the hoverboard in its object database. The robot may also send the data about the hoverboard and the data identifying the hoverboard to the shared object database 260 over the network 230. Each robot can then access the shared object database 260 to recognize hoverboards. For example, if a robot cannot recognize an object using its object database, the robot may access the shared object database 260 to attempt to recognize the object. In another example, each robot may update its object database using data stored in the shared object database 260. For example, each robot may synchronize its object database with the shared object database 260 on a periodic basis.

In another example, a robot that has identified or received data identifying a previously unrecognized object may share the data about the object and the identity of the object with other robots. In turn, each robot can update its object database with the data about the object and the identity of the object.

FIG. 3 depicts an example user interface 300 for identifying objects that a robot does not recognize. The example use interface 300 may be presented at a user device by a mobile tool, such as the mobile tool 242 of FIG. 2. The user interface 300 presents data about physical objects 302, people, and locations that have been detected by a robot, e.g., the robot 205 of FIG. 2, and that are not recognized by the robot. For example, the robot may log physical objects, people, animals, and locations that the robot detects and does not recognize. The robot may log the unrecognized objects and locations while exploring a new area and/or during normal operation in which the robot is performing tasks.

The user interface 300 may include a first user interface element 302 that presents the number of unrecognized physical objects detected by the robot. In this example, the user interface element 302 indicates that the robot has detected and logged 31 unrecognized physical objects, with 3 of the unrecognized objects being recognized in the last hour from a current time. Similarly, a second user interface element 304 indicates that the robot has detected 2 unrecognized people (1 in the last hour) and a third user interface element 306 indicates that the robot has detected 1 unrecognized location (0 in the last hour). A fourth user interface element (not shown) may indicate the number of unrecognized animals the robot has detected.

Each user interface element may be selectable by a user to view and identify the unrecognized objects or locations of the type represented by the user interface element. For example, user selection of the user interface element 302 may cause the user interface 300 to present data about the 31 unrecognized physical objects. In a particular example, the user selection of the user interface element 302 may result in the presentation of the user interface 400 of FIG. 4. Similarly, user selection of the user interface element 304 may cause the user interface 300 to present the data about the 2 unrecognized people and user selection of the user interface element 306 may cause the user interface 300 to present data about the 1 unrecognized location. The data can include one or more images, dimensions, text presented on the object, the location at which the object or location was detected, or other appropriate data about the object or location received from the robot.

The user interface presented in response to a selection of a user interface element 302-306 may allow a user to provide data about each unrecognized object. For example, the user interface may include a text entry field that allows the user to enter a name or identified for each unrecognized object. In another example, the user interface may include a drop down list that allows a user to select the name or identifier for the object from a list of objects. Similar user interface elements may allow the user to provide additional data about the unrecognized object, such as a category for the object, a type of the object, a make and/or model number for the object, locations where the object may be found, and/or other appropriate data about the object.

FIG. 4 depicts an example user interface 400 for identifying objects that a robot does not recognize. The example use interface 400 may be presented at a user device by a mobile tool, such as the mobile tool 242 of FIG. 2. For example, the user interface 400 may be presented in response to receiving data about an unrecognized object from a robot. In another example, the user interface may be presented in response to a selection of a set of unrecognized objects, e.g., at the user interface 300.

The user interface 400 can present data about an unrecognized object received from a robot. In this example, the user interface 400 presents an image 402 of an unrecognized bicycle. In other examples, the user interface may present dimensions of the object, text printed on the object, and/or other data obtained by the robot.

The user interface 400 also includes a text entry field 404 in which a user can enter the name of the unrecognized object. In this example, the user has entered the name "bicycle." The user interface 400 could include additional user interface elements that allow a user to provide additional data about the bicycle, such as the make and model of the bicycle, whether the bicycle is a men's or women's bicycle, to whom the bicycle belongs, the brand of the bicycle, and/or other appropriate data about the bicycle.

If the robot has provided a log of unrecognized objects, the user interface 400 may allow a user to view the next unrecognized object. For example, the user interface 400 may present an icon or button that, upon user selection, presents data about the next unrecognized object in the log. In another example, the user interface 400 may present data about the next unrecognized object in the log in response to a user swipe in a particular direction (e.g., from right to left) along a touch screen of a user device on which the user interface 400 is presented.

Although the example user interface 400 presents a single image 402 of a single unrecognized object, other user interfaces may present multiple images for one or more objects. For example, a user interface may present one or more images for each of a set of unrecognized objects. In another example, a user interface may present a first set of images of objects that the robot recognized and a second set of images of objects that the robot did not recognize.

Figure 5:
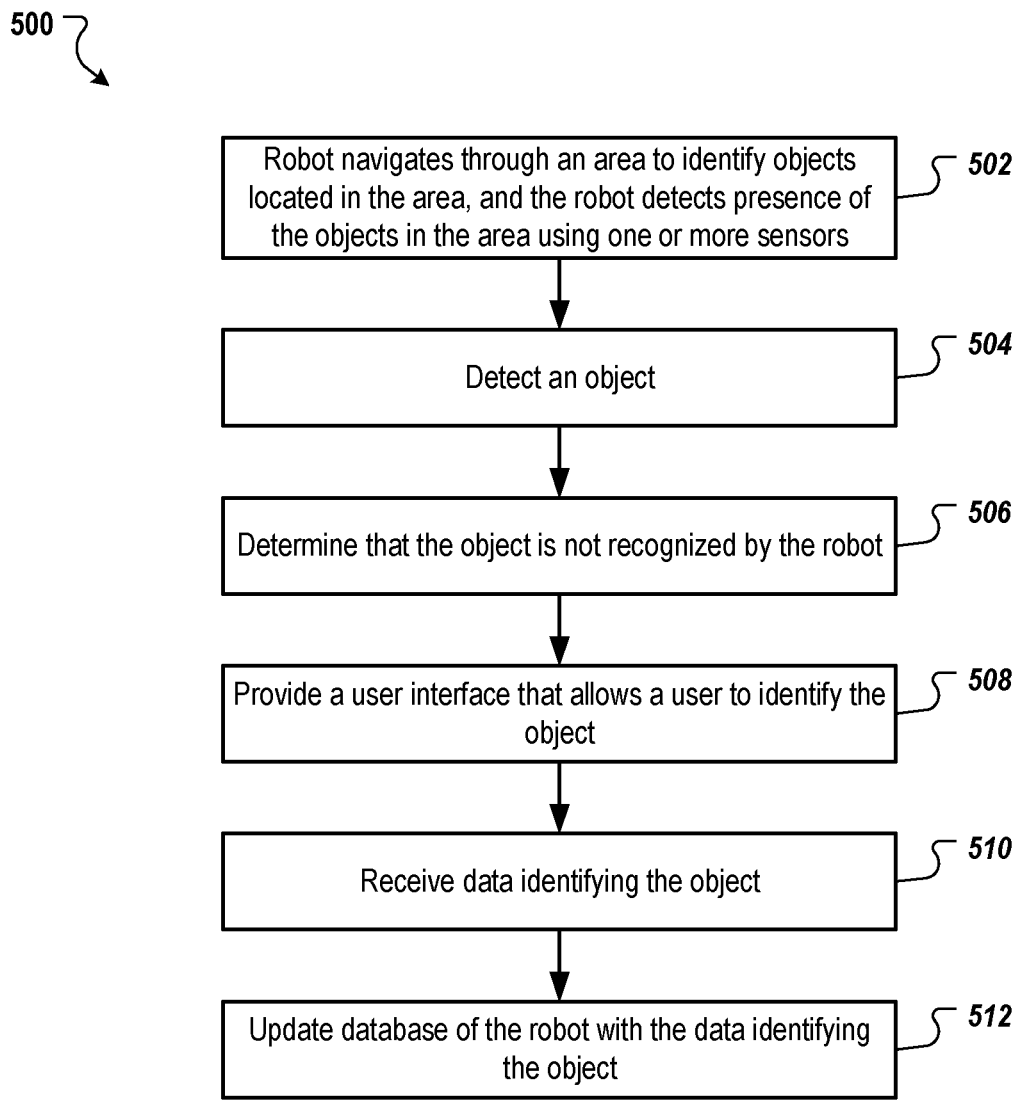
FIG. 5 depicts a flow chart of an example process for identifying an object that a robot does not recognize.

FIG. 5 depicts a flow chart of an example process 500 for identifying an object that a robot does not recognize. Operations of the process 500 can be implemented, for example, by a robot that includes one or more data processing apparatus, such as the robot 205 of FIG. 2.

The robot navigates through an area to identify objects located in the area (502). For example, a data processing apparatus of the robot may navigate the robot about the area without human control of the navigation. The data processing apparatus may navigate the robot about the area in response to a user command to identify objects in the area. For example, the command may be to operate in an explore mode of operation to become familiar with objects and locations in the area.

While navigating through the area, the robot can use one or more sensors to detect the presence of objects located in the area. For example, the robot may include a camera that captures images and or video of the area while the robot is navigating.

The robot detects an object (504). In some implementations, the robot analyzes images and/or video frames captured by the camera to detect the presence of objects in the images or video frames. For example, the robot may detect edges or contrasts in color, brightness, pattern, etc. to determine which portions of an image or video frame correspond to different objects. In another example, the robot may provide the images or video frames to a computer vision system installed on, or remote from the robot. The computer vision system may detect the presence of objects in the images or video frames and identify the location of the objects in the images to the robot.

The robot determines that the detected object is not recognized by the robot (506). In some implementations, the robot compares one or more images or video frames of the object to images of recognized objects. If there is a match, then the robot may recognize the detected object as the object in the matching image.

In some implementations, the robot acquires additional data about the object, for example, if the robot does not recognize the object by comparing a first image of the object to the images of the recognized objects. For example, the robot may approach the object to capture images from multiple different angles to compare to the images of the recognized objects. The robot may also measure the dimensions of the detected object, e.g, based on a distance between the robot and the object and the length of the object in an image captured by the robot. The robot can then compare the measured dimensions to dimensions of the recognized objects.

The robot may also search the object for text printed on the object or on a label attached to the object and compare the text to the name, description, or other data about the recognized objects. The robot may also search for a visual code printed on the object or a label attached to the object. If a visual code is found, the robot can capture an image of the visual code and send the image to a data source that can identify the object using the visual code. In another example, the database of objects maintained by the robot may include known visual codes for the recognized objects. In this example, the robot can compare the visual code in the image of the detected object to the visual codes for the recognized objects. If the images, dimensions, text, and/or visual codes do no match the corresponding data for a recognized image, the robot may determine that the detected object is not recognized by the robot.

In response to determining that the object is not recognized by the robot, the robot provides a user interface that allows a user to identify the object (508). For example, the robot may provide data describing the object to a mobile tool. The data describing the object can include one or more images of the object, dimensions of the object, and/or other data about the object obtained by the robot. In turn, the mobile tool may present a user interface that includes the data describing the object. The user interface may also include a user interface element that allows a user to enter or select the name of the object. The user interface may also allow the user to provide other data about the object. For example, the robot may provide the user interface 400 of FIG. 4.

The robot receives data identifying the detected object (510). For example, the robot may receive the data input by the user at the provided user interface. The data identifying the object may be provided to the robot in response to user interaction with the user interface, e.g., in response to the user providing input identifying the object. In turn, the robot may update its database of recognized objects with data identifying the object (512). For example, the robot may update the database to include the name of the object as a recognized object, one or more images of the object, and/or other data about the object received from the user or obtained by the robot.

Figure 6:
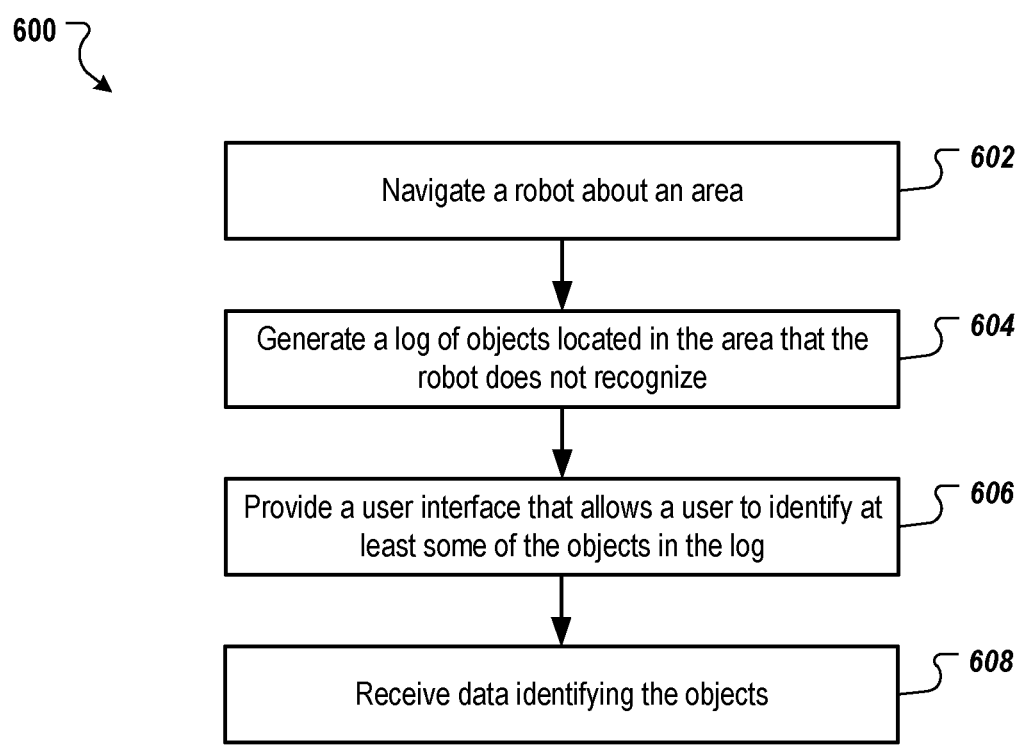
FIG. 6 depicts a flow chart of an example process for generating a log of objects that a robot does not recognize and receiving data identifying the objects.

FIG. 6 depicts a flow chart of an example process 600 for generating a log of objects that a robot does not recognize and receiving data identifying the objects. Operations of the process 600 can be implemented, for example, by a robot that includes one or more data processing apparatus, such as the robot 205 of FIG. 2.

The robot navigates about an area (602). For example, a data processing apparatus of the robot may navigate the robot about the area without human control of the navigation. The data processing apparatus may navigate the robot about the area in response to a user command to identify objects in the area. For example, the command may be to operate in an explore mode of operation to become familiar with objects and locations in the area. While navigating through the area, the robot can use one or more sensors to detect the presence of objects located in the area. For example, the robot may include a camera that captures images and or video of the area while the robot is navigating.

The robot generates a log of objects located in the area that the robot does not recognize (604). For example, the robot may attempt to identify each detected object by comparing data about the object to data about recognized objects, as described above with reference to FIG. 4. The robot may also attempt to identify the object using other data sources. For example, the robot may initiate an image search at a search engine using one or more images of the object and analyze search results provided in response to the image search to identify the object.

The robot provides a user interface that allows a user to identify each object in the log (606). The robot may send data about the objects in the log to a mobile tool that presents a user interface that allows the user to identify each object in the log. For example, the interface may be the same as, or similar to, the user interface 300 of FIG. 3.

The robot receives data identifying at least some of the objects in the log (608). For example, the user may enter data identifying each object into the user interface. The mobile tool that presents the user interface may send the received data to the robot. In turn, the robot may update its object database with the data identifying the objects. For example, the robot may create an entry in the object database for the object and included, in the entry, the name of the object received from the user, one or more images of the object, and/or other data about the object received from the user or otherwise obtained by the robot.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus of a robot:
navigating a robot through an area to identify objects located in the area, the robot detecting presence of the objects in the area using one or more sensors;
attempting to determine an identity of a particular object detected in the area using an image processing technique and one or more images of the particular object captured by a camera of the robot;
determining that the robot cannot determine the identity of the particular object using the image processing technique;
in response to determining that the robot cannot determine the identity of the particular object using the image processing technique, providing data that causes a user device to present a user interface that includes data describing the particular object, the data describing the particular object including the one or more images of the particular object captured by the camera of the robot, the user interface being configured to present multiple categories of objects and to receive user input that identifies a category for the particular object;
receiving, in response to interaction with the user interface, data identifying the category for the particular object; and
in response to receiving the data identifying the category for the particular object:
updating a database for the robot with the data identifying the category for the particular object; and
enabling the robot to perform one or more actions with respect to objects of the identified category that the robot was previously unable to perform before receiving the data identifying the category for the particular object.

2. The method of claim 1, wherein enabling the robot to perform one or more actions with respect to objects of the identified category comprises:
associating software for performing the one or more actions with the data identifying the category for the particular object in the database.

3. The method of claim 2, further comprising:
obtaining one or more applications for the particular object, each application instructing the robot to perform one or more actions with respect to the particular object; and
enabling the robot to use the one or more applications when the robot detects the particular object.

4. The method of claim 1, further comprising automatically obtaining, by the robot, information about the particular object in response to determining that the robot cannot determine the identity of the particular object using the image processing technique.

5. The method of claim 4, wherein automatically obtaining information about the object comprises:
capturing, by the robot and using the camera of the robot, one or more images of the particular object;
initiating a search using the one or more images; and
receiving search results identified in response to the search,
wherein the method further comprises determining an identity of the particular object based on multiple resources linked to by the search results specifying the identity of the particular object and including content related to the particular object.

6. The method of claim 1, further comprising:
generating a log of objects for which the robot cannot determine the identity using the image processing technique; and
providing a user interface that prompts a user to identify each object in the log.

7. The method of claim 1, further comprising:
receiving, at the user interface, an image of a given object and data identifying the given object; and
updating the database with the image and the data identifying the given object.

8. The method of claim 1, further comprising:
receiving a product catalog that includes images of one or more objects and data describing the one or more objects; and
storing, in the database and for each of the one or more objects, the image of the object and data identifying the object.

9. The method of claim 1, further comprising:
causing a robot to navigate about a particular area that includes multiple objects;
generating a log of objects located in the particular area and that the robot does not recognize; and
providing a user interface that allows the user to identify each object in the log.

10. The method of claim 1, wherein the object includes a physical object, a location, an animal, or a person.

11. The method of claim 1, wherein the user interface presents multiple images of objects that the robot did not recognize.

12. The method of claim 1, wherein:
the user interface is generated by a mobile tool of a user device using one or more images of the particular object captured by the robot;
the user interface is presented by the user device; and
the user device sends the data identifying the particular object to the robot.

13. The method of claim 1, wherein attempting to determine an identity of a particular object comprises:
detecting presence of the particular object in the area;
determining that the particular object is not an object that the robot has previously recognized; and
in response to determining that the particular object is not an object that the robot has previously recognized:
capturing, using the camera of the robot, multiple images of the particular object from multiple angles; and
measuring dimensions of the particular object;
attempting to determine the identity of the particular object using the multiple images and the measured dimensions.

14. A robot, comprising:
a camera;
a robot control system that navigates the robot through an area to identify objects located in the area; and
an object detection system that:
detects presence of the objects in the area using one or more sensors;
attempts to determine an identify of a particular object detected in the area using an image processing technique and one or more images of the particular object captured by the camera;
determines that the robot cannot determine the identity of the particular object using the image processing technique;
in response to determining that the robot cannot determine the identity of the particular object using the image processing technique, provides, to a user interface, data that causes the user interface to present data describing the particular object, the data describing the particular object including the one or more images of the particular object captured by the camera, the user interface being configured to present multiple categories of objects and to receive user input that identifies a category for the particular object;
receives, in response to interaction with the user interface and from the user interface, data identifying the category for the particular object; and
in response to receiving the data identifying the category for the particular object;
updates a database for the robot with the data identifying the category for the particular object; and
enables the robot to perform one or more actions with respect to objects of the identified category that the robot was previously unable to perform before receiving the data identifying the category for the particular object.

15. The robot of claim 14, wherein enabling the robot to perform one or more actions with respect to objects of the identified category comprises:
associating software for performing the one or more actions with the data identifying the category for the particular object in the database.

16. The robot of claim 14, wherein the object detection system:
obtains one or more applications for the particular object, each application instructing the robot to perform one or more actions with respect to the particular object; and
enables the robot to use the one or more applications when the robot detects the particular object.

17. The robot of claim 14, wherein the object detection system automatically obtains information about the particular object in response to determining that the robot cannot determine the identity of the particular object using the image processing technique.

18. The robot of claim 17, wherein the object detection system:
automatically obtains information about the object by:
capturing, by the robot and using the camera of the robot, one or more images of the particular object;
initiating a search using the one or more images; and
receiving search results identified in response to the search; and
determines an identity of the particular object based on one or more objects referenced by resources linked to by the search results.

19. The robot of claim 14, wherein the object detection system:
generates a log of objects for which the robot cannot determine the identity using the image processing technique; and
provides a user interface that prompts a user to identify each object in the log.

20. A non-transitory computer storage medium encoded with a computer program, the program comprising instructions that when executed by one or more data processing apparatus of a robot cause the data processing apparatus to perform operations comprising:
navigating the robot through an area to identify objects located in the area, the robot detecting presence of the objects in the area using one or more sensors;
attempting to determine an identity of a particular object detected in the area using an image processing technique and one or more images of the particular object captured by a camera of the robot;
determining that the robot cannot determine the identity of the particular object using the image processing technique;

in response to determining that the robot cannot determine the identity of the particular object using the image processing technique, providing data that causes a user device to present a user interface that includes data describing the particular object, the data describing the particular object including the one or more images of the particular object captured by the camera of the robot, the user interface being configured to present multiple categories of objects and to receive user input that identifies a category for the particular object;

receiving, in response to interaction with the user interface, data identifying the category for the particular object; and in response to receiving the data identifying the category for the particular object:
 updating a database for the robot with the data identifying the category for the particular object; and
 enabling the robot to perform one or more actions with respect to objects of the identified category that the robot was previously unable to perform before receiving the data identifying the category for the particular object.

\* \* \* \* \*